United States Patent Office 2,941,427
Patented June 21, 1960

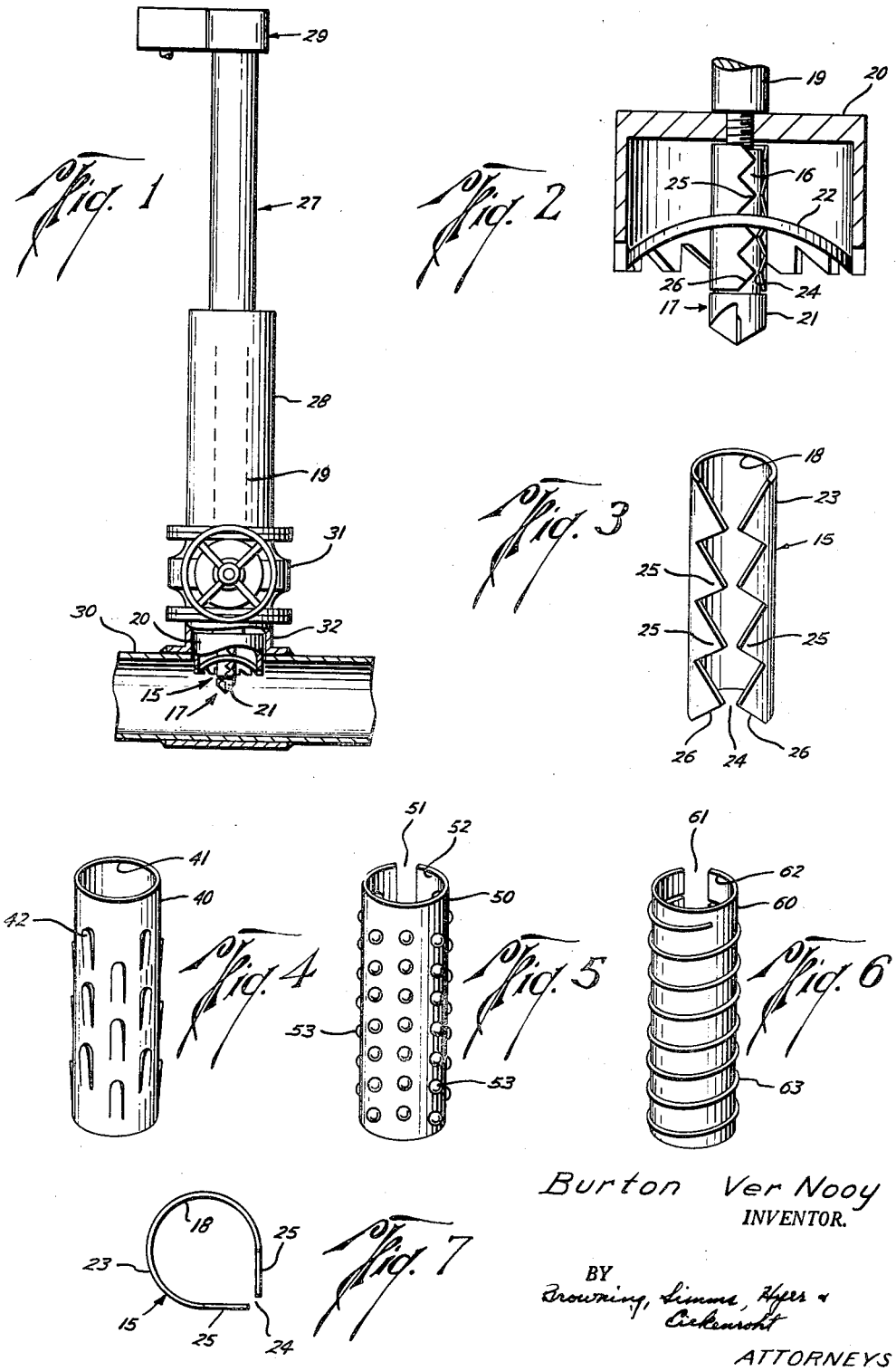

2,941,427

COUPON RETAINER MEANS

Burton Ver Nooy, Tulsa, Okla., assignor to T. D. Williamson, Inc., Tulsa, Okla.

Filed Sept. 10, 1959, Ser. No. 839,222

15 Claims. (Cl. 77—42)

This invention relates to an improved coupon retaining means for use with tapping machines and in particular to a sleeve means for engaging and retaining a coupon cut from a pipe.

In the repair, maintenance and construction of pipelines or in the measurement and sampling of fluid being transported in the line, it is often necessary to make a tap in the line without taking it offstream. This operation is called a "hot tap" and is accomplished by means of a hot tapping or boring machine. These hot tapping machines are known to the art and include a drive mechanism, a fluid-tight housing, a boring bar mounted in the housing, a pilot drill attached to the end of the boring bar, and an annular cutter coaxially mounted between the pilot drill and boring bar.

In making a hot tap it is usually the practice to weld a split saddle to the pipe line at the point where the tap is to be made. The saddle is provided with a nipple to which a valve is secured. When these elements are in place, the tapping machine is mounted on the valve and the valve is opened to permit the boring bar, pilot drill and annular cutter to be advanced from the housing into contact with the pipe wall.

As the cutting operation proceeds the pilot drill penetrates the pipe wall first and then the annular cutter completes its passage through the pipe wall. The portion of the pipe wall severed by the annular cutter is called a coupon, and it is desirable to retain this coupon on the pilot drill and prevent it from falling into the pipe when the cut is completed. When the coupon has been cut from the pipe and while it is being retained on the pilot drill, the boring bar is retracted back through the valve into the housing. The valve is then closed and the tapping machine removed.

From the foregoing it can be seen that the pilot drill on a hot tapping machine performs at least two functions: (1) guides the annular cutter, and (2) retains the coupon.

Various devices have been provided on the pilot drill for engaging the coupon to keep it from falling into the pipe when the cut is completed. For example, the pilot drill has been provided with spring loaded balls which are depressed as the pilot drill passes through the pipe and then expand to engage the underside of the coupon after penetration is completed. Other devices include dogs attached to the drill which are manipulated to expand and engage the underside of the coupon when the drill has penetrated the pipe. Still other devices include a split pilot drill which must be operated to expand and engage the coupon after the pilot has passed through the pipe.

In all of the devices presently known, the coupon retaining mechanism is mounted on the pilot drill so as to rotate with the drill during the cutting operation. This arrangement can cause many undesirable results. For example, in the case of the spring loaded balls and dogs, the pilot drill borehole may be enlarged by the action of the balls and dogs bearing against the wall of the borehole during the cutting operation to the extent that the coupon cannot be retained when the cut is completed and will drop into the pipe. This situation is likely to occur when tapping relatively soft material such as concrete or cast iron pipe.

It may be desirable to withdraw the pilot and annular cutter before the cut is complete in order to inspect and possibly replace the cutter. However when the dogs, above mentioned, have penetrated and expanded on the underside of the coupon, it is not possible to remove the cutter without excessive damage to the pilot or enlargement of the pilot drill borehole.

The split pilot drill mechanism is complicated and expensive and requires extra manipulation and steps after the drill has penetrated the coupon in order for it to perform its coupon retaining function.

An object of this invention is to provide a coupon retainer that is inexpensive, rugged and positive in action.

Another object of this invention is to provide a coupon retainer that floats on the pilot drill and is adapted to engage the coupon without manipulation such as is required by split pilot drills.

Another object is to provide a coupon retainer particularly suitable for use on concrete or cast iron pipe or similar conduits made of relatively soft material.

Another object is to provide a coupon retainer which permits removal of the annular cutter during the cutting operation without excessive damage to either the coupon or retainer as is the case when dogs are used to retain the coupon.

Another object is to provide a coupon retainer that can be quickly and easily detached from the pilot drill and discarded after use by either disconnecting the pilot drill and sliding the retainer off the drill shank or by flexing the retainer to remove it from the drill shank.

Another object is to provide a coupon retainer that is rotatably mounted on the pilot drill and does not cut, scuff, abrade or otherwise enlarge the bore in the coupon made by the pilot drill during the cutting operation.

Other objects and advantages are inherent and will become apparent upon reading the accompanying specification and claims.

These and other objects are accomplished by a preferred embodiment of this invention wherein a coupon retainer comprising a sleeve is mounted on the shank of the pilot drill so as to permit rotation of the drill within the sleeve, while the sleeve is limited in longitudinal movement with respect to the pilot drill. Gripping means are provided on the body of the sleeve for engaging and carrying the coupon when the sleeve has advanced into the pilot drill borehole. Thus, in the practice of this invention the coupon retainer does not rotate with respect to the coupon and thereby enlarge the pilot drill borehole, but rather is advanced without rotary motion through the coupon as the drill penetrates the wall of the pipe. The gripping means of the coupon retainer engages the coupon and carries it when the annular cutter completes its passage through the pipe. The coupon can then be withdrawn from the pipe while carried by the coupon retainer.

Referring now to the drawings wherein like characters designate like parts:

Fig. 1 is a schematic elevation of a tapping machine mounted on a pipe and equipped with a preferred coupon retainer according to this invention, the housing and pipe being broken away to show the coupon retainer and associated elements.

Fig. 2 is a vertical cross-sectional view of the end of the boring bar and cutters of a tapping machine incorporating a preferred embodiment of this invention, with a coupon being carried by the coupon retainer.

Fig. 3 is an isometric view of a preferred embodiment of the coupon retainer sleeve of this invention.

Figs. 4, 5 and 6 are similar views of other embodiments of the coupon retainer sleeve of this invention.

Fig. 7 is an end view of the preferred retainer sleeve of Fig. 3.

Referring now to Fig. 1, a tapping machine indicated generally at 27 has a housing 28 with a boring bar 19 receivable therein and mounted for both rotational and longitudinal movement in the housing through the drive mechanism indicated generally at 29. The end of the boring bar 19 is provided with coaxially mounted pilot drill 17 and annular cutter 20, annular cutter 20 being disposed between drill 17 and bar 19. Tapping machines of this type are well known in the art and for a more detailed description of one preferred type of tapping machine, reference is made to the instruction manual for "Hillco Tapping Machine" sold by T. D. Williamson, Inc., of Tulsa, Oklahoma.

A resilient coupon retainer sleeve indicated generally at 15 is rotatably mounted on the shank of pilot drill 17 and is adapted to engage the head portion 21 of the pilot drill at one end and the annular cutter 20 at the other end to limit longitudinal movement of the sleeve on the pilot drill. In this illustration the cutting operation has been completed and the coupon is being carried on sleeve 15. Boring bar 19 can now be withdrawn and the coupon removed from the pipe as described above.

Referring now to Figs. 2, 3 and 7, coupon retainer sleeve 15 is mounted on shank 16 of a pilot drill designated generally at 17. The shank 16 of drill 17 is smaller than the head 21 of the drill to provide a shoulder for engagement with sleeve 15 as described below. The bore 18 of sleeve 15 is adapted to rotatably receive shank 16 to permit rotation of the pilot drill therein when bore bar 19 is turned by the tapping machine during the tapping operation. Annular cutter 20 is coaxially mounted on the end of the boring bar and is disposed between the pilot drill 17 and boring bar 19.

It will be observed that retainer sleeve 15 is adapted to engage the shoulder on head portion 21 of the pilot drill 17 at one end and to engage annular cutter 20 at the other end so as to limit longitudinal movement of the sleeve with respect to pilot drill 17 while permitting rotation of the pilot drill and cutter with respect to the sleeve. With this arrangement a floating sleeve is provided that can carry a coupon 22 cut from a pipe but will not rotate with respect to the coupon during the cutting operation and thereby enlarge the borehole formed in the coupon by the pilot drill.

The body portion of resilient sleeve 15 is defined by a substantially cylindrical member 23 having a split or gap 24 longitudinally disposed in the wall thereof. It is preferable to extend gap 24 the full length of body 23; however, in some applications it may be desirable to provide for a gap extending only part way along the length of body 23.

A plurality of outwardly extending opposing teeth 25 are provided at the edges of body member 23 at gap 24 to form a resilient gripping means on body 23. In the preferred embodiment, teeth 25 are formed by tangential extensions of the walls of body 23 and provide a resilient action when urged inwardly toward gap 24. However, it is contemplated that teeth 25 can be separately formed and mounted on body 23 either at gap 24 or another point on the outer surface of body 23. Further, it is within the scope of this invention to provide for resilient action either in body member 23 or teeth 25 or both of these elements can be of a resilient nature. In any event, a resilient coupon retainer sleeve is provided which is urged into contact with the coupon as hereinafter described. When the teeth are oppositely disposed in gap 24, two teeth can grip the coupon at the same time and thus provide a positive connection between the sleeve and coupon. However, the teeth may be alternately arranged along gap 24 if so desired. It is also preferable to space the teeth along gap 24 so that the spacing will be slightly greater than the wall thickness of the coupon. This spacing permits the teeth to expand and engage the underside of the coupon with a maximum overlap between the teeth and coupon to provide a positive connection therewith when the sleeve is urged into contact with the coupon by its resilient action.

The length of sleeve 15 can vary widely and is primarily a function of the depth of cutter 20 and the ratio of the diameter of the pipe being tapped to the diameter of the cutter. It will be recalled that longitudinal movement of sleeve 15 in a direction away from the pipe is limited by engagement of one end of the sleeve with the annular cutter, and further, it is preferable that the sleeve will penetrate to the underside of the coupon prior to the time that the annular cutter completes its pass through the pipe wall.

Thus, if a deep cutter is utilized to make a tap in a pipe of large diameter as compared to the diameter of the cutter, then the coupon will be relatively flat and will extend upwardly into the cutter only a short distance. In this case the sleeve should be of substantially the same length as the depth of the cutter so that it will penetrate through the coupon before the coupon is severed by the cutter. On the other hand, if the cutter is substantially the same diameter as the interior diameter of the pipe being tapped, and its depth is equal to its diameter, then the coupon will extend nearly to the top of the cutter and the sleeve can be relatively short in order to penetrate the coupon prior to the time the cutter completes its pass through the pipe wall.

Inasmuch as the same cutter may be used to make taps on pipes having different diameters it is preferred to provide a sleeve which is at least as long as the cutter is deep. In any event, the sleeve should be of sufficient length so that it will penetrate through the coupon prior to the time when the annular cutter completes its pass through the pipe wall.

The diameter of the cylindrical body portion 23 of preferred sleeve 15 is slightly smaller than the diameter of the cutting head 21 of pilot drill 17. This permits the body element of the sleeve to be easily received in the pilot drill borehole and also provides engagement with the shoulder at head 21 to limit longitudinal movement of the sleeve toward head 21. On the other hand, resilient teeth 25 extend tangentially outwardly from body 23 and must be moved inwardly to reduce the size of gap 24 when the sleeve is introduced into the pilot drill borehole so that the sleeve can penetrate through to the underside of the coupon. Since the teeth have a resilient action they will tend to expand and engage the underside of the coupon when the sleeve penetrates therethrough. This resilient action of the teeth elements on sleeve 15 provides for positive engagement and connection between the sleeve and coupon.

As noted above, it may be desirable to provide the resilient action of the sleeve in the body element 23, or in some instances resilient action may be supplied by both body member 23 and teeth 25. In these cases the outer diameter of body member 23 can be slightly larger than head 21 of the pilot drill since the walls of the body member will be moved inwardly to reduce the size of gap 24 when the sleeve penetrates the pilot drill borehole. Of course, the inner diameter of body member 23 should be controlled so that the sleeve can engage head 21 and will not slide off the pilot drill while carrying the coupon. Again the resilient action of the sleeve elements provide for positive engagement and connection between the sleeve and coupon.

Teeth 25 are sloped away from the end of the sleeve as indicated at 26 to provide for easier insertion of the sleeve into the pilot drill borehole. With this arrangement the sleeve rides into the borehole on the slope 26 of teeth 25 to thereby urge the resilient element of the sleeve inwardly and reduce the size of gap 24. With the initial penetration of the coupon thus accomplished, the sleeve is then easily fed through the coupon as the cutter advances through the pipe wall. Slope 26 will provide for easier initial penetration of the coupon by the sleeve regardless of whether the resilient action of the sleeve is provided by the teeth, the body element or both of these elements.

In the operation of the preferred embodiment of this invention, resilient coupon retainer sleeve 15 is mounted on pilot drill 17 as described above. The pilot drill and coupon sleeve are then mounted on the tapping machine as previously described. The tapping machine is connected to the pipe 30 through valve 31 and nipple 32 whereby the boring bar 19 carrying annular cutter 20, pilot drill 17 and coupon retainer sleeve 15, can be advanced from housing 28 through valve 31 and nipple 32 into contact with the wall of pipe 30, all while the system is under pressure.

The boring bar is then rotated to advance the pilot drill and annular cutter through the pipe wall to cut a coupon therefrom. Since the longitudinal movement of the sleeve away from the pipe is limited, the coupon retainer sleeve is carried into the bore formed by the pilot drill as the boring bar advances. As explained above, although the sleeve is carried into the bore of the coupon, there is no rotation of the sleeve with respect to the coupon.

As the teeth of the coupon retainer sleeve contact the edge of the pilot drill borehole, the sleeve will ride into the bore on the slope 26 of teeth 25 and thereby provide for easier penetration of the coupon by the sleeve. Continued penetration by the sleeve tends to close the gap in the wall thereof and provides for intimate contact between the sleeve and the wall of the bore through the resilient action of the teeth.

When the coupon retainer sleeve has penetrated through the coupon, the resilient teeth are urged outwardly to engage the underside of the coupon and carry it when the annular cutter completes its pass through the pipe, as shown in Fig. 1.

When the cut is accomplished the boring bar is retracted into its housing and the valve closed. The tapping machine with the coupon being carried by the retainer sleeve can then be removed. It is contemplated that the coupon retainer sleeve can either be recovered for subsequent use, or can be made a disposable unit such that the pilot drill can be removed from the tapping machine and the sleeve and the coupon can be removed from the drill and discarded. It will be observed that it is also possible in some applications to remove the coupon retainer sleeve merely by first removing the coupon from the sleeve and then by separating the edges of the cylinder at gap 24 sufficiently to permit passage of the shank of the pilot drill therethrough.

Referring now to Fig. 4 wherein another embodiment of the coupon retainer sleeve of this invention is shown, the body element comprises a cylindrical member 40 and is provided with a bore 41 for rotatably receiving the shank of a pilot drill. A plurality of outwardly extending resilient fingers 42 have been formed in the wall of the cylinder 40 to provide a resilient gripping means for engaging and carrying a coupon. Here it will be observed that the resilient action of the sleeve is provided by the gripping fingers and there is no gap in the body wall as is the case in the preferred sleeve of Fig. 3.

In this embodiment the diameter of body element 40 is slightly smaller than the diameter of the head of the pilot drill so as to permit easy insertion of the sleeve into the pilot drill borehole. The sleeve is mounted on the pilot drill with the fingers extending away from the head of the drill so that as the sleeve passes through the coupon, the resilient fingers are depressed inwardly toward body member 40. As each finger completes its passage through the coupon, it is urged outwardly towards its original position and in engagement with the underside of the coupon.

This embodiment can be used to advantage when a pipe is made of soft material and the coupon is large and heavy. This advantage is gained due to the fact that the fingers are easily depressed as the sleeve passes through the coupon and therefore do not damage the bore in the coupon. Then when the fingers have expanded on the other side of the coupon and into engagement therewith, the heavier the coupon, the better support will be given by the fingers, that is a heavier coupon would merely tend to spread the fingers further away from the sleeve and provide for an increasingly positive engagement between the fingers and the coupon. On the other hand, this embodiment is not desirable in case it is necessary to withdraw the cutter before the tap is completed and after the fingers have engaged the underside of the coupon. In this situation, when the fingers have expanded on the other side of the coupon, any attempt to withdraw the coupon from the sleeve merely tends to expand the fingers and cause a tighter connection therebetween.

The length of this coupon retainer should be sufficient to permit at least one of the resilient fingers to pass through the coupon so that it can expand and engage the lower side of the coupon prior to the time that the annular cutter severs the coupon from the pipe. Here, as in the preferred sleeve of Fig. 3, the sleeve length required will depend upon the depth of the cutter and the ratio of the diameter of the pipe being tapped to the diameter of the cutter. In any case it is preferred that the sleeve be of sufficient length so that when it is in engagement with the annular cutter at one end it will have at least one of the resilient fingers expanded on the underside of the coupon at the other end, prior to the time that the annular cutter completes its pass through the pipe to sever the coupon. In this connection it is preferable to provide at least two fingers in the same transverse plane spaced around the face of the cylinder so that the coupon will be supported by at least two fingers when the tap is completed.

The longitudinal spacing of the fingers (or groups of fingers in the same transverse plane) along the cylinder body can be adjusted in any way desired since the longitudinal spacing of the fingers is not limited by the thickness of the coupon. This is true because the fingers individually provide the resilient action of this sleeve and therefore can independently provide the necessary engagement and connection between the coupon sleeve. Thus, the coupon can be carried by one finger even though the next longitudinally spaced finger up the sleeve body might still be depressed within the bore of the coupon. In this respect the coupon retainer of Fig. 4 differs from the embodiment of Fig. 5.

In operation, the coupon retainer of Fig. 4 is rotatably mounted on the shaft of the pilot drill with fingers 42 extending away from the head of the pilot drill. The drill and sleeve are then mounted on the tapping machine similarly as was explained above in connection with the preferred sleeve of Fig. 3. As the pilot drill penetrates the wall of the pipe, the coupon retaining sleeve is carried into the pilot drill borehole and resilient fingers 42 are thereby depressed inwardly toward the face of the sleeve body. As each finger completes its passage through the coupon, it expands outwardly to engagement position on the underside of the coupon. When the annular cutter completes its pass through the wall of the pipe to sever the coupon therefrom, the coupon is supported and carried by resilient fingers 42 and can be withdrawn from the pipe by retracting the boring bar.

Referring now to Figs. 5 and 6, further embodiments of the retainer sleeve of my invention are shown. The body elements of these sleeves are defined by substantially cylindrical resilient members 50 and 60, respectively, with each body member having a corresponding split or gap 51 and 61 longitudinally disposed in the wall thereof and further having corresponding bores 52 and 62 for rotatably receiving the shank of a pilot drill.

The gripping means 53 of the sleeve of Fig. 5 comprises a plurality of laterally extending spherical knobs protruding from the surface of body member 50. When the sleeve is carried through the coupon, these knobs engage the underside of the coupon to provide connection between the sleeve and coupon and are held in engagement with the coupon by the resilient action of the cylindrical body member 50.

Since the resilient action of this sleeve is provided by the body member 50, it is desirable to space the knobs longitudinally along the face of the body member at a distance at least as great as the thickness of the coupon being cut. Such a spacing permits maximum overlap between the knobs and coupon when the body member expands to provide a positive connection between the coupon and sleeve. If a smaller spacing is utilized, the body of the sleeve cannot expand sufficiently to permit a maximum overlap between the knob and the coupon because the next knob up the sleeve is still bearing against the bore wall in the coupon. Further, it is preferable to space at least two knobs around the face of body member 50 and in the same transverse plane thereof so that at least two knobs will engage the underside of the coupon when the cut is completed. This provides for a more positive connection between the sleeve and coupon.

The diameter of the body member 50 is preferably smaller than the diameter of the head of the pilot drill. This permits easy initial penetration of the sleeve body into the pilot drill borehole. As the sleeve penetrates the borehole, the knobs 53 will contact the edge of the borehole and compress the walls of resilient body member 50 inwardly so as to reduce the size of gap 51. Thus, it is desirable to so arrange and coordinate the relative dimensions of gap 51, knobs 53 and body member 50 such that the sleeve can be easily inserted into the coupon borehole, be compressed and carried through the borehole and then expanded so as to cause knobs 53 to engage the underside of the coupon to thereby support and carry the coupon on the sleeve. These relative dimensions can be readily selected by those in the art after reading the disclosure herein contained.

Similarly as has been pointed out regarding sleeves of Fig. 3, the length of the sleeve of Fig. 5 should be sufficient that at least one of the gripping means (knobs 53) can engage the underside of the coupon before the annular cutter has completed its pass through the pipe wall and severed the coupon from the pipe.

Referring now to Fig. 6, the gripping means 63 comprises a spiralling ridge extending outwardly from the face of resilient body member 60. The spiralling arrangement here provided will convert any tendency of the sleeve to rotate to an accompanying tendency to feed into the borehole on the coupon. The ridge engages the underside of the coupon and is held in firm relation thereto by the resilient action of the body member 60. Here again the diameter of body member 60 should be slightly smaller than the diameter of the head of the pilot drill to provide for easy initial insertion of the sleeve into the pilot drill borehole.

As the sleeve is carried into the borehole, spiralling ridge 63 bears against the edge of the borehole to deflect the walls of resilient body member 60 inwardly and reduce the size of gap 61. When the sleeve emerges on the underside of the coupon, the resilient action of body member 60 forces ridge 63 into engagement with the underside of the coupon to thereby permit the sleeve to carry the coupon from the pipe.

As pointed out in connection with prior embodiments the length of the sleeve should be sufficient to permit the sleeve to extend through to the underside of the coupon at the time the annular cutter completes its pass through the pipe wall.

Also, having read the description herein contained, one skilled in the art can select the relative dimensions of gap 61, ridge 63 and body member 60 to accomplish the retaining function of this invention. In this connection the gap 61 should be sufficiently wide to permit deflection of the walls of body member 60 inwardly so that the sleeve can pass through the borehole to the underside of the coupon. Thus, for a given diameter of the body member 60 a wider gap 61 must be provided as a depth of the ridge 63 is increased. Conversely, a smaller ridge 63 permits a smaller gap 61 in order that the sleeve can penetrate through to the underside of the coupon.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

The invention having been described, what is claimed is:

1. A coupon retainer means comprising, in combination, a pilot drill, sleeve means including a sleeve body mounted on the pilot drill for free rotation with respect thereto, said sleeve means being limited for longitudinal movement on the pilot drill, said sleeve means also including gripping means on said sleeve body for engaging and carrying a coupon cut from a pipe, at least a portion of the sleeve means being resilient so that the gripping means are urged outwardly to engage the coupon as the pilot drill drills a hole therein.

2. A coupon retainer means comprising, in combination, a pilot drill having a head portion and a shank portion smaller in diameter than said head portion, a resilient floating sleeve means rotatably mounted on said shank and adapted to engage said head portion at one end for limiting longitudinal movement of the sleeve with respect to the pilot drill, said resilient floating sleeve means including a body portion and a gripping means mounted on said body portion for engaging and carrying a coupon cut from a pipe.

3. A coupon retainer means comprising, in combination, a pilot drill having a head portion and a shank portion smaller in diameter than the head portion, a resilient floating sleeve means coaxially mounted on said shank portion, said resilient floating sleeve means comprising a substantially cylindrical body member having a bore adapted to receive said shank portion and permit rotation of the shank therein and further having a diameter slightly smaller than the diameter of the head portion of the pilot drill to permit easy insertion of the sleeve into a borehole made by the head portion of the pilot drill, said body member being adapted to engage said head portion of the pilot drill at one end for limiting longitudinal movement of the sleeve toward the head portion of the drill, and gripping means on said body member for engaging and carrying a coupon cut from a pipe.

4. A coupon retainer according to claim 3 wherein said gripping means comprises a plurality of resilient fingers formed on the face of said body member extending outwardly from the body member and away from the head portion of said pilot drill and being adapted to be depressed inwardly toward said body member as the sleeve passes through the borehole in a coupon and then to expand outwardly into engagement with the underside of the coupon to provide a connection between the sleeve and coupon for carrying the coupon on the pilot drill.

5. A coupon retainer sleeve according to claim 4 wherein at least two of said resilient fingers are angularly spaced around the surface of said body member in the same transverse plane thereof whereby at least two fingers can simultaneously expand into engagement with the underside of the coupon to provide a positive connection between said coupon and sleeve.

6. A coupon retainer means comprising, in combination, a pilot drill having a head portion and a shank portion smaller in diameter than said head portion, a resilient coupon retainer sleeve rotatably mounted on said shank portion, said resilient coupon retainer sleeve comprising a substantially cylindrical body member having a bore therein for rotatably receiving said shank portion and being slightly smaller in diameter than said head portion of the pilot drill for permitting easy insertion of the sleeve into a borehole formed by said head portion and said body member being adapted to engage said head portion at one end to limit longitudinal movement of the sleeve toward the head portion of the drill, gripping means extending outwardly from said body member and beyond the diameter of said head portion of the pilot drill for engaging and carrying a coupon cut from a pipe, and a gap longitudinally disposed in a wall of said body member to permit said sleeve to be reduced in diameter whereby the sleeve can penetrate said bore hole and then expand to bring the gripping means into engagement with the underside of the coupon to carry the coupon when it is cut from a pipe.

7. A coupon retainer according to claim 6 wherein said gripping means comprises a plurality of resilient opposing teeth extending tangentially outwardly from the wall of said body member at the gap therein and being spaced longitudinally along said body member at a distance at least as great as the thickness of the coupon being cut, said resilient teeth being adapted first for inward movement to reduce the size of said gap member and thereby permit penetration of the coupon by the sleeve and then to expand outwardly into engagement with the underside of the coupon to carry said coupon when it is severed from the pipe.

8. A coupon retainer according to claim 6 wherein said body member provides the resilient action of said sleeve, the walls of said body member being adapted for inward movement to reduce the size of said gap in the wall of the body member and permit passage of the sleeve through the borehole and then upon penetration of the coupon to expand outwardly to provide engagement between the gripping means and the underside of the coupon and establish a positive connection between the sleeve and coupon.

9. A coupon retainer according to claim 8 wherein said gripping means comprises a plurality of spherical knobs spaced along the face of said body means with at least two of said knobs angularly spaced around the face of the body member in the same transverse plane thereof and further spaced longitudinally along said body member such that the distance between knobs in adjacent transverse planes is at least as great as the thickness of the coupon being cut to permit the body member to expand and provide a maximum overlap between the knobs and underside of the coupon when said penetration is accomplished to thereby establish said positive connection between the sleeve and coupon.

10. In a hot tapping machine including a drive mechanism, a fluid-tight housing, a boring bar mounted in said housing adapted for rotational and longitudinal movement therein, a pilot drill mounted on the end of said boring bar having a head portion and a shank portion smaller in diameter than the head portion, and an annular cutter coaxially mounted on the boring bar between the bar and shank portion of the pilot drill, an improved coupon retainer for carrying a coupon cut from a pipe comprising, a resilient sleeve including a body element and a gripping means mounted on said body element, said body element comprising a substantially cylindrical member having a bore for receiving the shank of a pilot drill and permitting rotation of the shank therein and further having a diameter slightly smaller than the head portion of the pilot drill to permit easy insertion of the sleeve into a borehole made in a coupon by the pilot drill, said gripping means comprising a plurality of protrusions extending outwardly from said body element and beyond the diameter of the head portion of the pilot drill sufficiently to contact the edge of the borehole in the coupon as the sleeve is inserted therein whereby the resilient sleeve is urged inwardly to permit penetration and passage of one end of the sleeve through the coupon, said gripping means then being expanded into engagement with the underside of the coupon by said resilient action after said penetration of the coupon has been accomplished.

11. A coupon retainer according to claim 10 wherein said resilient action of the sleeve is provided by a gripping means comprising, a plurality of resilient fingers extending outwardly from said body element and adapted to engage the edge of the borehole in the coupon as the sleeve is inserted therein such that the fingers are depressed inwardly toward the body member to permit the sleeve to penetrate the coupon and then expand outwardly into engagement with the underside of the coupon after said penetration for supporting and carrying the coupon when it is severed from a pipe.

12. A coupon retainer according to claim 11 wherein at least two of said resilient fingers are angularly spaced around the face of said body element in the same transverse plane thereof whereby at least two of said fingers can simultaneously expand into said engagement with the underside of the coupon to provide a positive connection between the sleeve and coupon.

13. A coupon retainer according to claim 10 wherein said body member is provided with a gap longitudinally disposed in the wall thereof and wherein said gripping means comprise a plurality of resilient opposing teeth arranged longitudinally along said body member at the gap therein for providing said resilient action of the sleeve sleeve such that said teeth are urged inwardly to reduce the size of said gap and thereby permit penetration of the coupon by the sleeve and then expand outwardly into engagement with the underside of the coupon after said penetration to support and carry the coupon on the sleeve.

14. A coupon retainer according to claim 13 wherein said teeth are spaced such that the distance between successive teeth is at least as great as the thickness of the coupon being cut to permit maximum overlap between the teeth and coupon upon said outward expansion to thereby provide a positive connection between the coupon and sleeve.

15. A coupon retainer means comprising, in combination, a pilot drill having a cutting head, a sleeve assembly mounted on the pilot drill above the head for relative rotation but limited endwise movement with respect to the pilot drill, said sleeve assembly including a body portion and gripping means on said body portion normally extending radially beyond the pilot drill head, at least a portion of the sleeve assembly being resilient so that as the pilot drill drills a hole through the coupon, the sleeve assembly moves downwardly therewith without rotation and the gripping means engage the sides of the hole to be moved inwardly thereby and after passing through the hole, move outwardly to grip the lower side of the coupon.

References Cited in the file of this patent
UNITED STATES PATENTS

| | | |
|---|---|---|
| 485,715 | Smith | Nov. 8, 1892 |
| 2,800,812 | Mueller et al. | July 30, 1957 |